May 11, 1943.　　　　　　　D. BROIDO　　　　　　　2,319,108
APPARATUS FOR ASSORTING RECORD CARDS, SHEETS, AND THE LIKE
Filed Aug. 23, 1940　　　　13 Sheets-Sheet 1

Inventor
Daniel Broido
by
A. Knight Caroad
Attorney

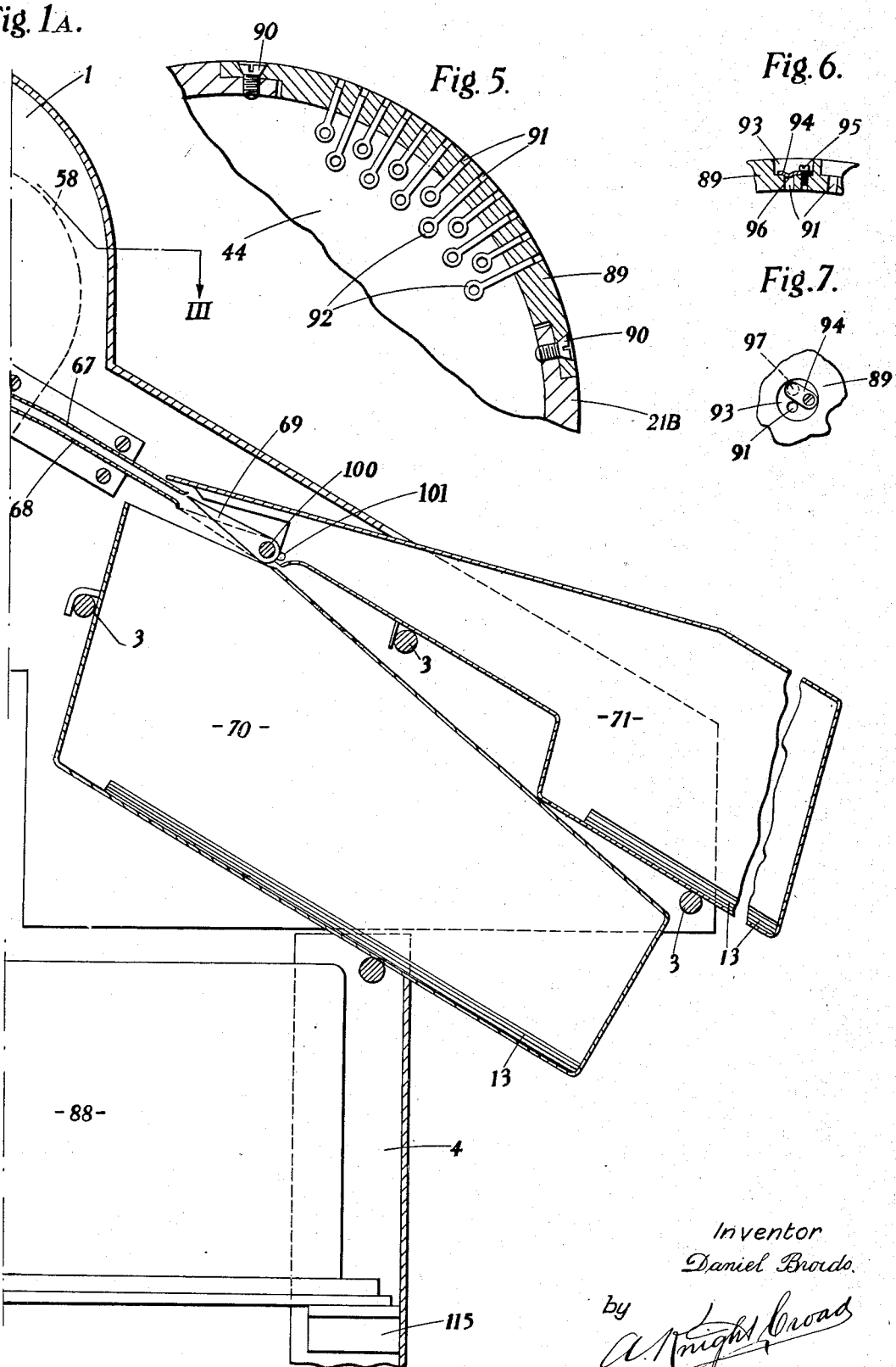

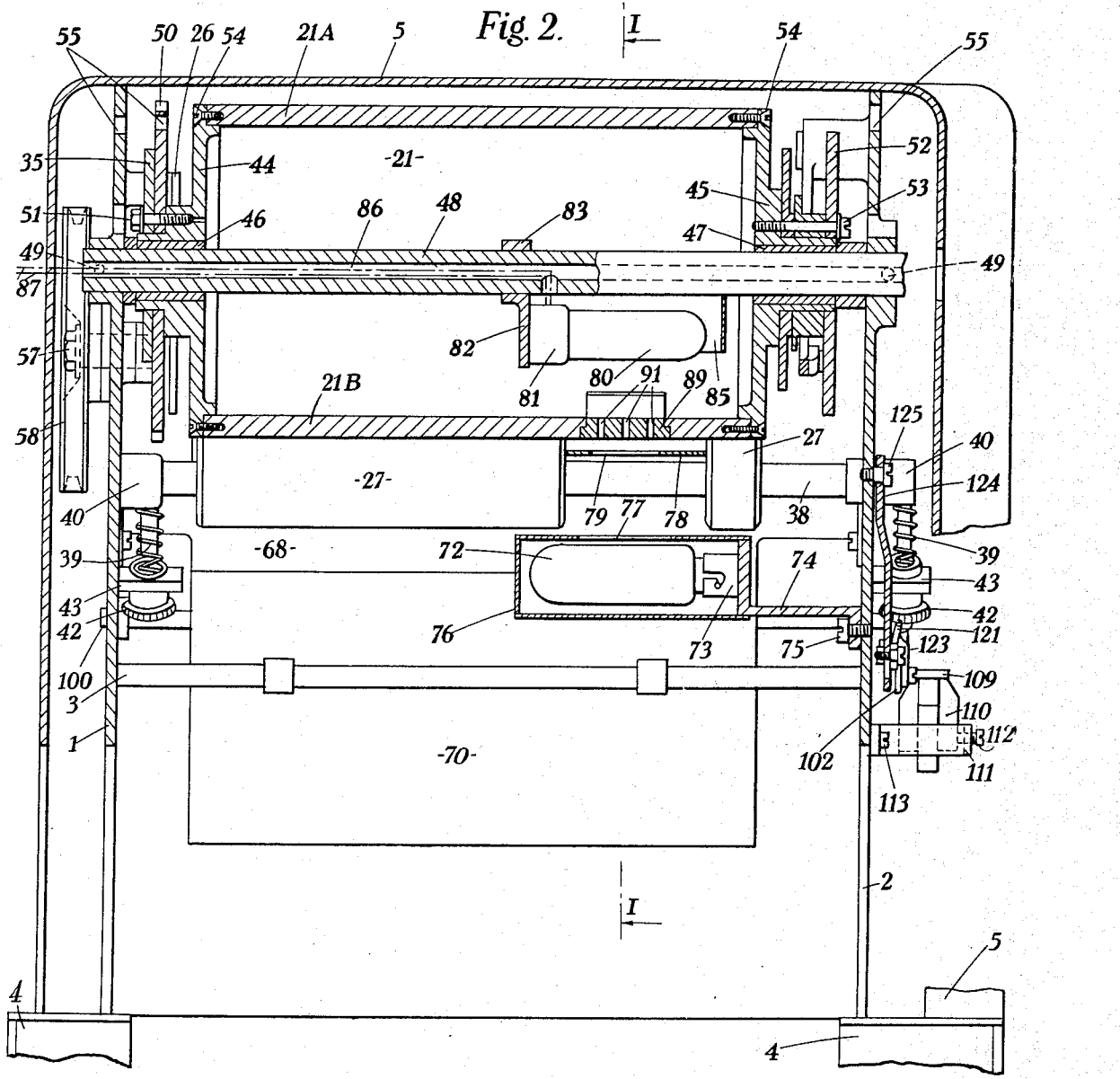

May 11, 1943.   D. BROIDO   2,319,108
APPARATUS FOR ASSORTING RECORD CARDS, SHEETS, AND THE LIKE
Filed Aug. 23, 1940    13 Sheets-Sheet 4

Inventor
Daniel Broido
by
A. Knight Broad
Attorney

Fig. 4.
Fig. 3A.
Fig. 16.
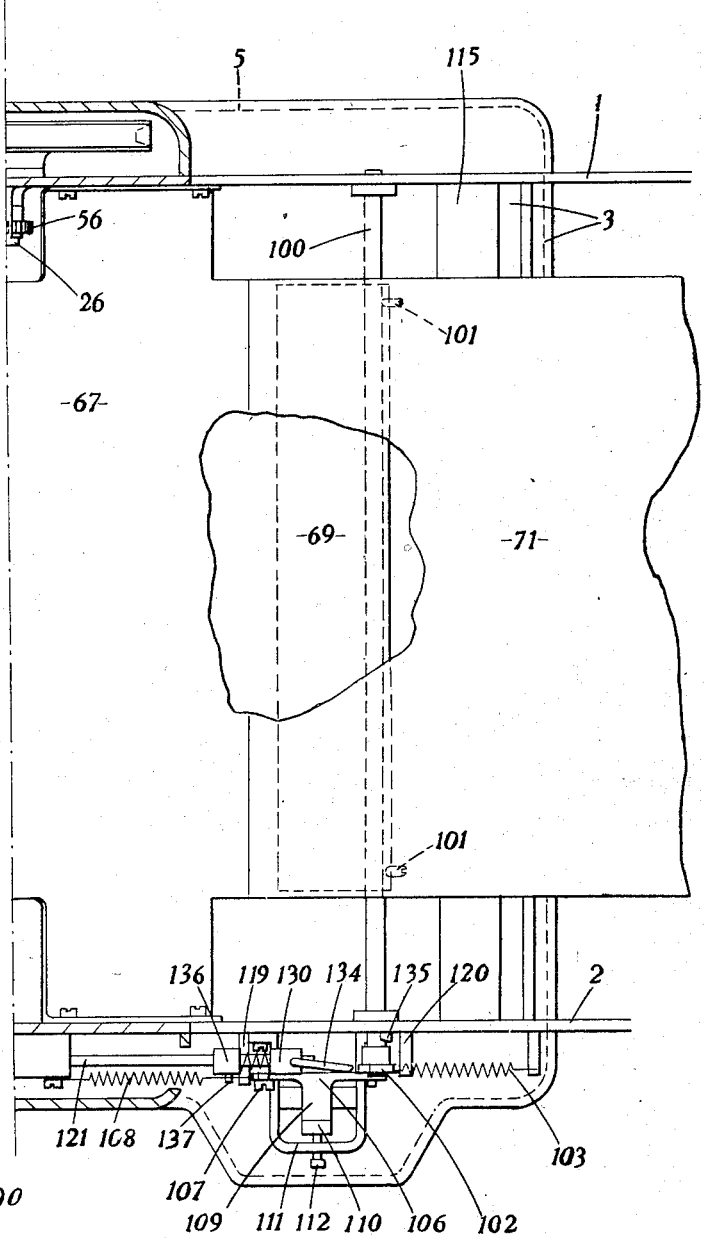
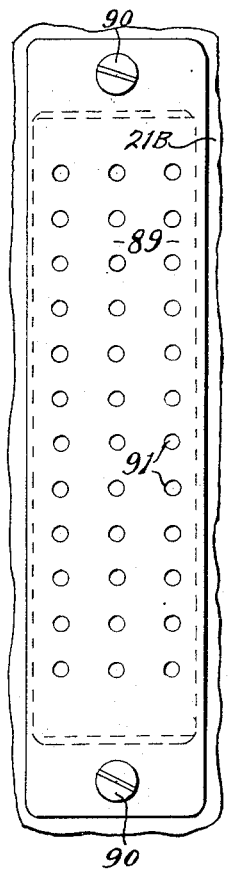
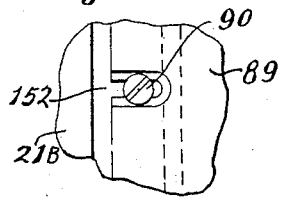

May 11, 1943.  D. BROIDO  2,319,108
APPARATUS FOR ASSORTING RECORD CARDS, SHEETS, AND THE LIKE
Filed Aug. 23, 1940  13 Sheets-Sheet 6
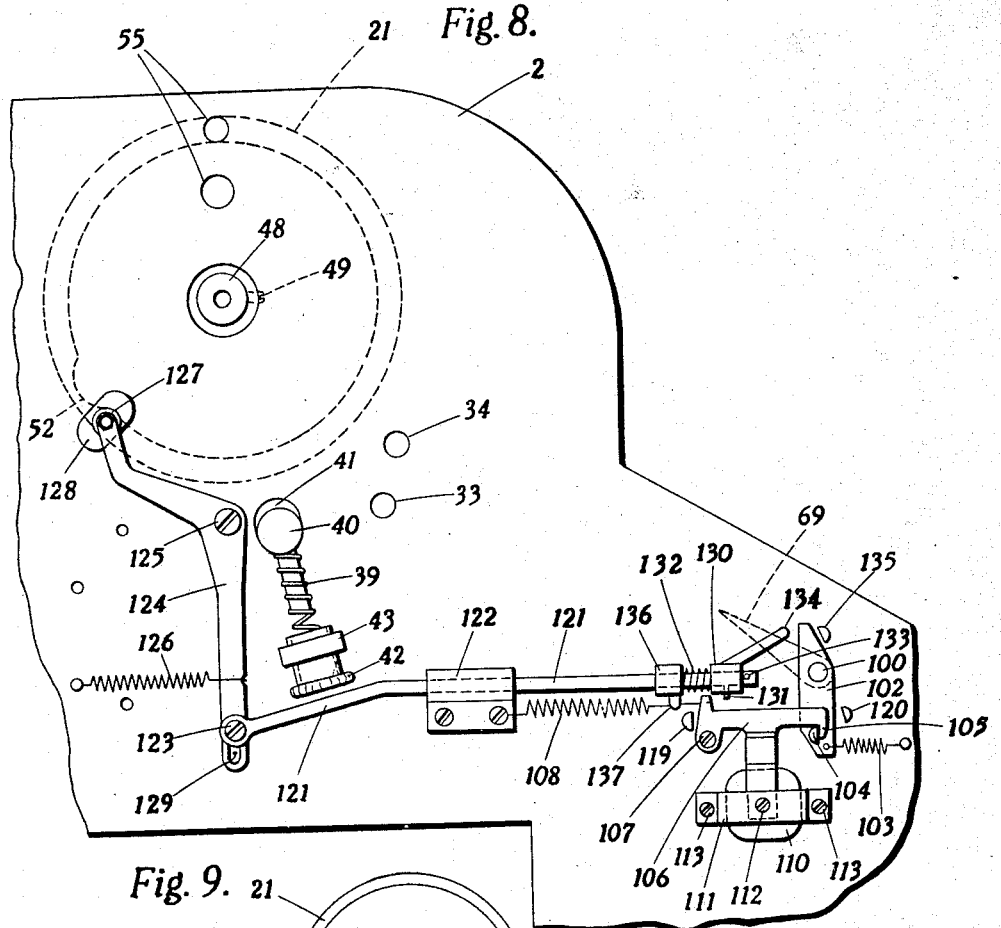
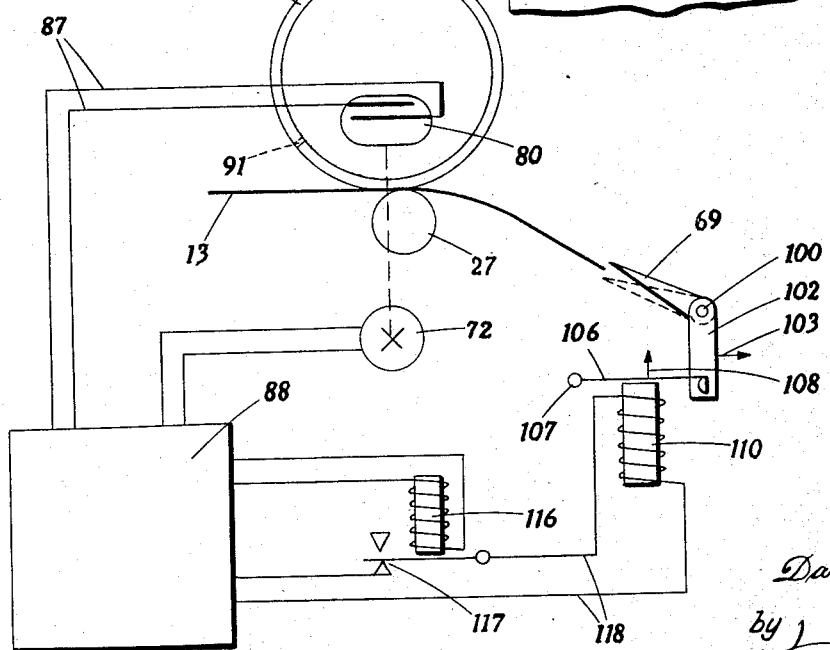
Inventor
Daniel Broido
by A. Knight Croad
Attorney

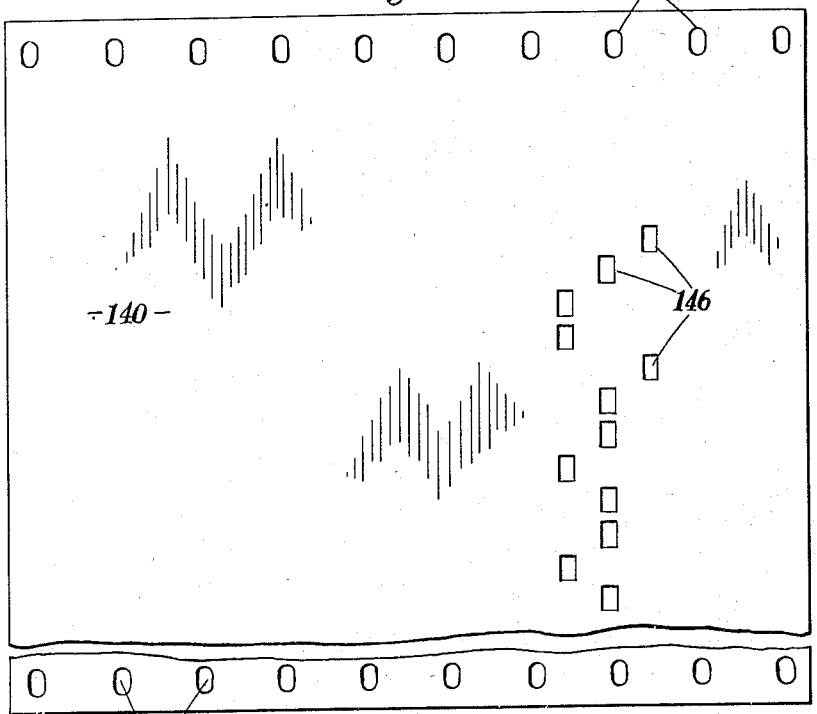

May 11, 1943.   D. BROIDO   2,319,108
APPARATUS FOR ASSORTING RECORD CARDS, SHEETS, AND THE LIKE
Filed Aug. 23, 1940   13 Sheets-Sheet 12

Fig. 14.

NAME  DOE  John
   Male: 1   Female: 2

ADDRESS  7 Clifton Ave. Bristol 2
   Gt. Britain: 3   Brit. Oversea: 4
   Abroad: 4

AGE  29
   Under 15: 6   17-25: 7
   26-35: 8   36-45: 9
   over 45: 10

HEALTH: Good: 11   Medium: 12   Bad: 13

FAMILY: Married 14   single: 15

EDUCATION: St John's Watford
   elementary: 16   secondary: 17
   evening classes: 18   university: 19

TECHNICAL TRAINING: Radio
   mechanic: 20   electrician: 21
   fitter: 22   welder: 23
   turner: 24   draughtsman: 25

LANGUAGES:
   French: 26   Spanish: 27
   Russian: 28   German: 29

SPECIAL TRAINING:
   Radio: 30   Car driving: 31
   Riding: 32   First Aid: 33

REGISTRATION NO: 735

|   | HUNDREDS | TENS | UNITS |
|---|---|---|---|
| 0 | 34, 35 | 39, 40 | 44, 45 |
| 1 | 34, 36 | 39, 41 | 44, 46 |
| 2 | 34, 37 | 39, 42 | 44, 47 |
| 3 | 34, 38 | 39,43 | 44, 48 |
| 4 | 35, 36 | 40, 41 | 45, 46 |
| 5 | 35, 37 | 40, 42 | 45,47 |
| 6 | 35, 38 | 40, 43 | 45, 48 |
| 7 | 36,37 | 41, 42 | 46, 47 |
| 8 | 36, 38 | 41, 43 | 46, 48 |
| 9 | 37, 38 | 42, 43 | 47, 48 |

REMARKS  Television Experience

PERSONAL FILE NO: 12893

*Underline the items which apply.*

—99—

Inventor
Daniel Broido
by A. Knight Broad
Attorney

May 11, 1943.  D. BROIDO  2,319,108
APPARATUS FOR ASSORTING RECORD CARDS, SHEETS, AND THE LIKE
Filed Aug. 23, 1940  13 Sheets-Sheet 13
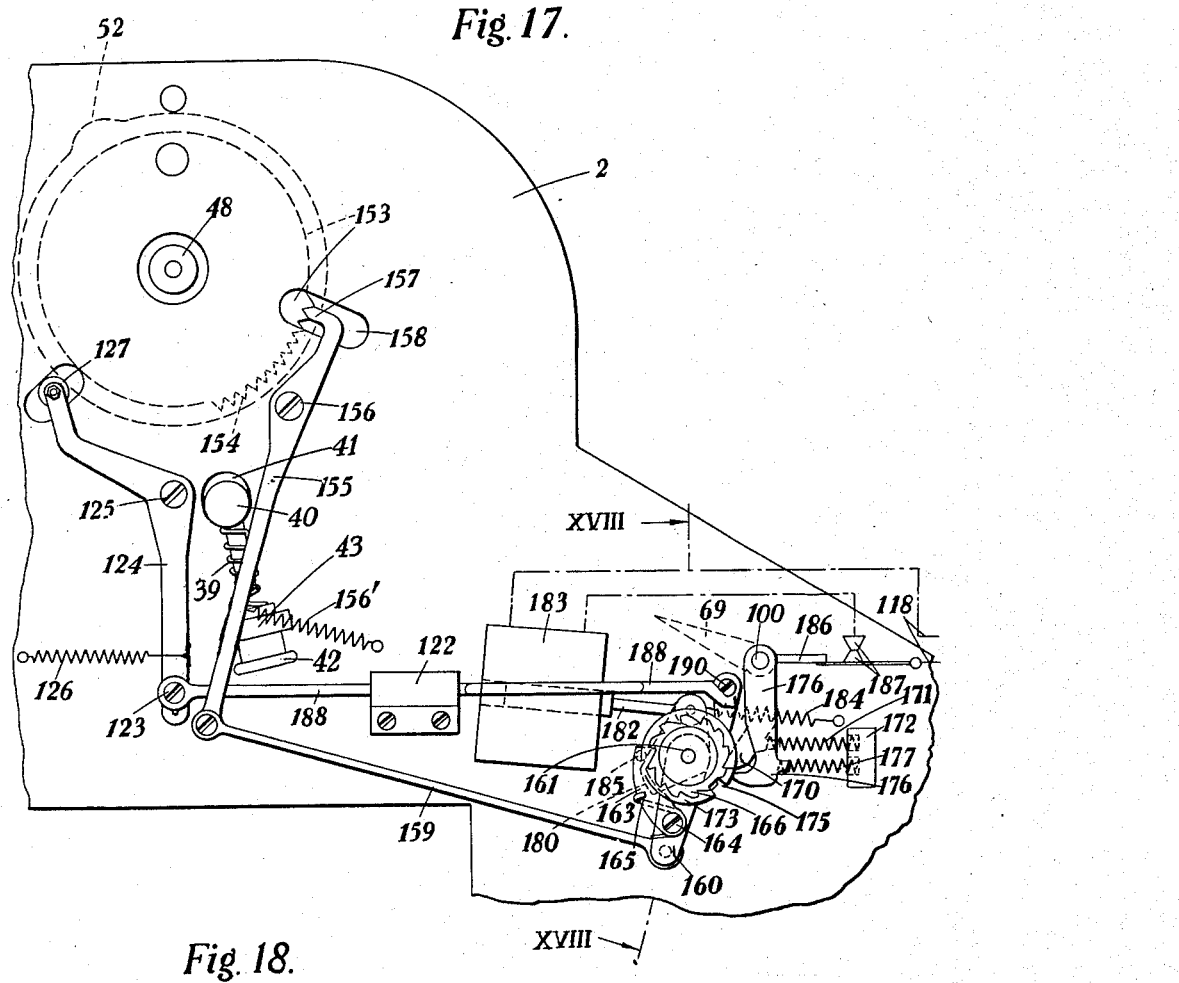
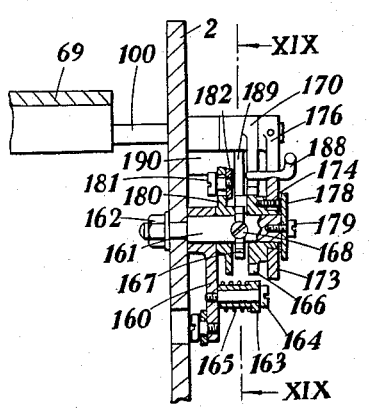
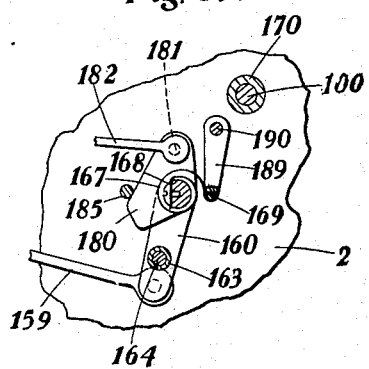
Inventor
Daniel Broido
by
A. Knight Croad
Attorney Patented May 11, 1943

2,319,108

UNITED STATES PATENT OFFICE 2,319,108

APPARATUS FOR ASSORTING RECORD CARDS, SHEETS, AND THE LIKE

Daniel Broido, London, England

Application August 23, 1940, Serial No. 353,903
In Great Britain August 29, 1939

9 Claims. (Cl. 209—111)

This invention relates to apparatus for assorting record cards, sheets and the like of the kind in which the recorded information is represented by differently positioned marks having a transparency different from that of the carrier, the records being fed into an analysing position between a source of radiant energy and a device sensitive to the radiant energy, in which position the marks on the record are analysed by a rotary scanning member disposed between the source of radiant energy and the sensitive device, which latter controls a sorting flap.

The broad object of the invention is to provide, in apparatus of the kind referred to, a scanning member which will permit of providing a simple, cheap and reliable sorting apparatus.

A further object of the invention is to provide a single control member which can be used to provide for a number of different assorting operations.

Further objects of the invention are to provide a rapid scanning cycle permitting a maximum output; to provide apparatus which can be readily and simply combined with a printing device, whereby the cards, sheets or the like fed into the machine can be printed either simultaneously with the sorting operation or independently thereof; and, finally, to provide a sorting apparatus which can be readily incorporated in known types of office printing machines.

The invention is illustrated in the accompanying drawings, wherein:

Figures 1 and 1A together represent a vertical longitudinal section through a preferred embodiment of the invention, taken on line I—I of Figure 2;

Figure 2 is vertical transverse section on line II—II of Figure 1, the drum being turned so that a row of scanning holes is in the plane of the figure;

Figures 3 and 3A together represent a sectional plan view taken substantially on line III—III, Figure 1 with the drum rotated through an angle of about 180° from the position shown in Figure 1.

Figures 4 and 5 are detail views, illustrating respectively in development, and in section, the arrangement of scanning holes;

Figures 6 and 7 are detail views illustrating respectively in sectional elevation, and in plan view, an alternative cancelling device for the scanning holes;

Figure 8 is a partial side view of the machine with the cover removed, illustrating the arrangement of the electromagnet and the re-setting device;

Figure 9 is a diagram illustrating the electrical connections;

Figure 1:
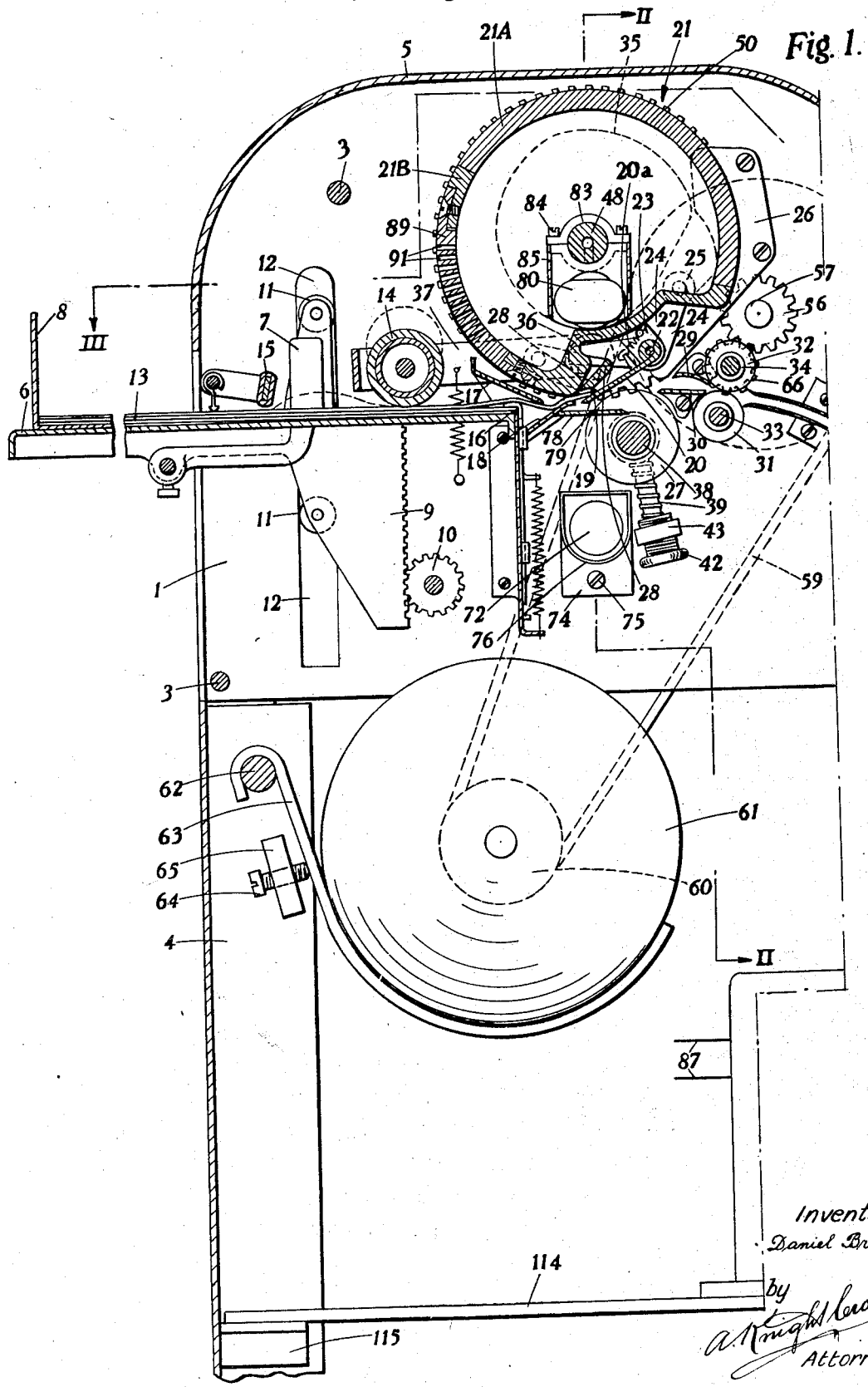
Figure 10:
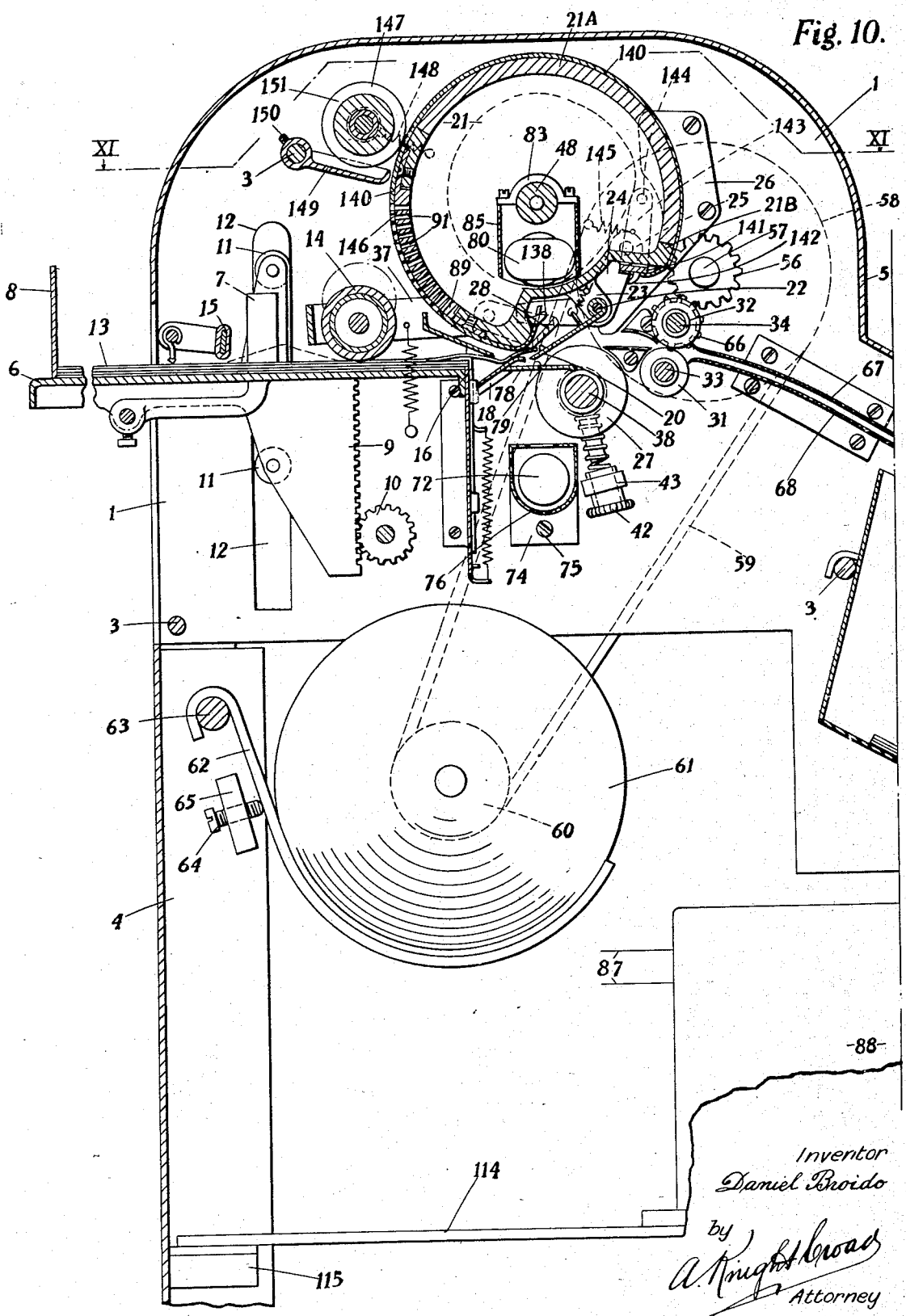
Figure 10A:
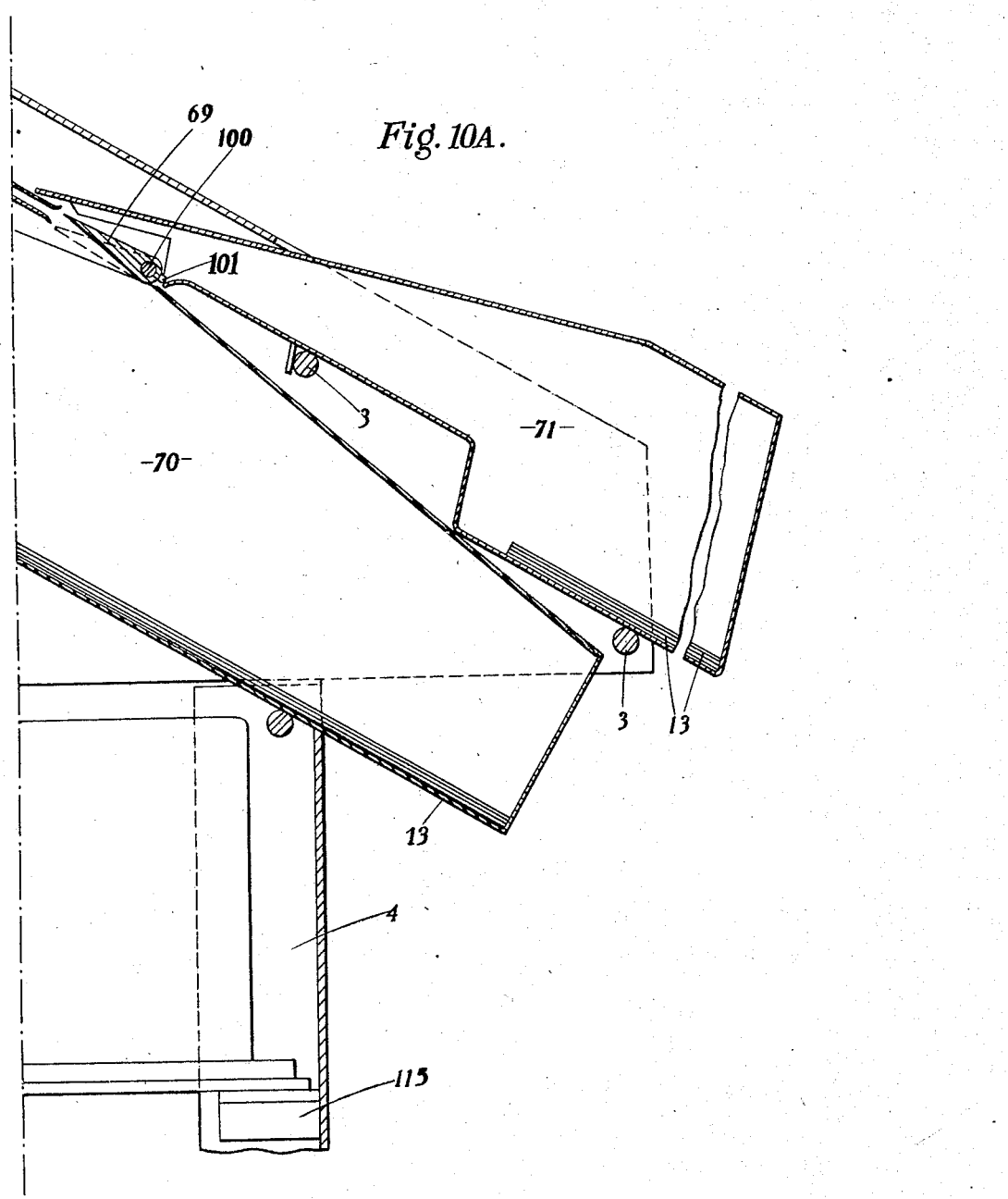
Figure 11:
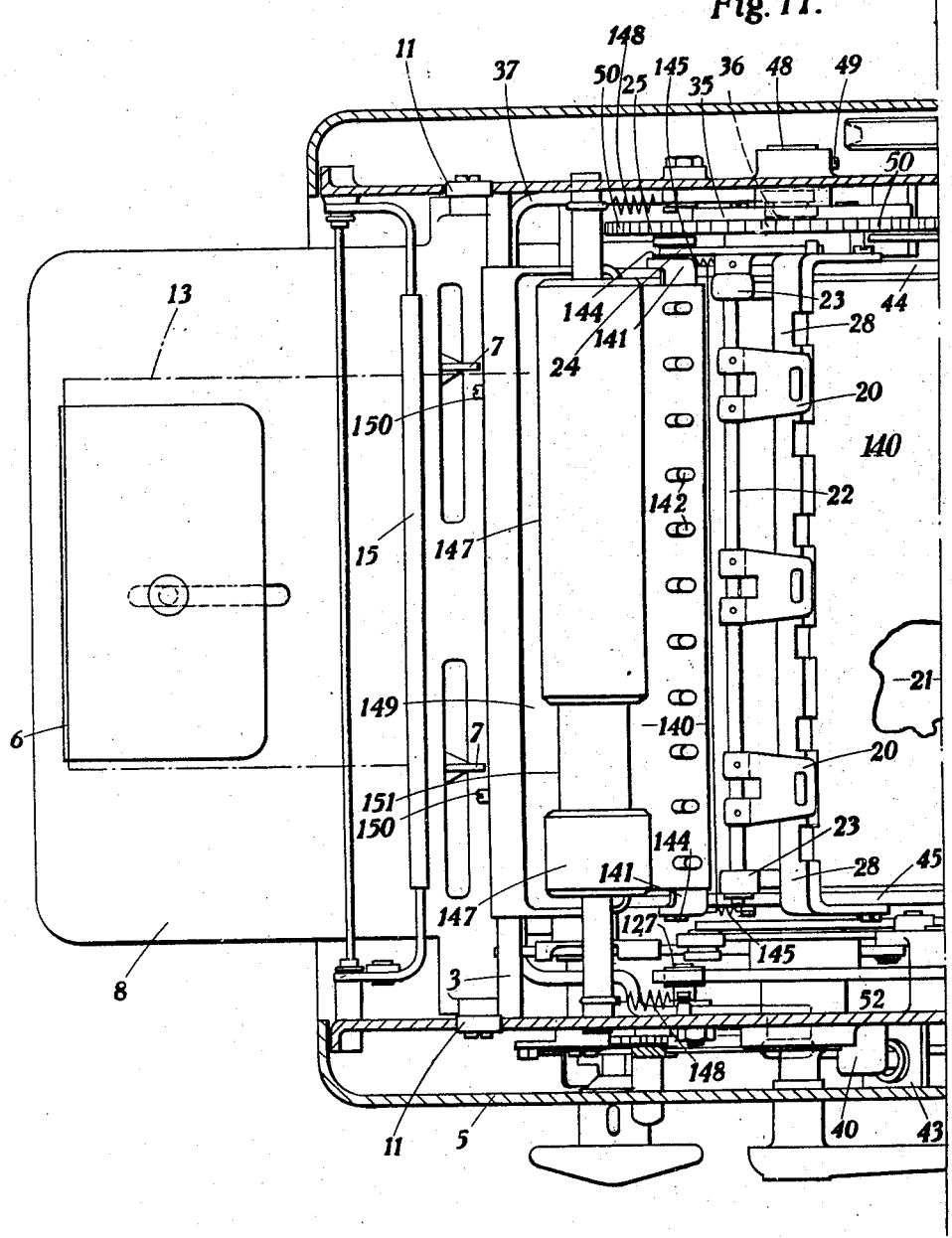
Figure 11A:
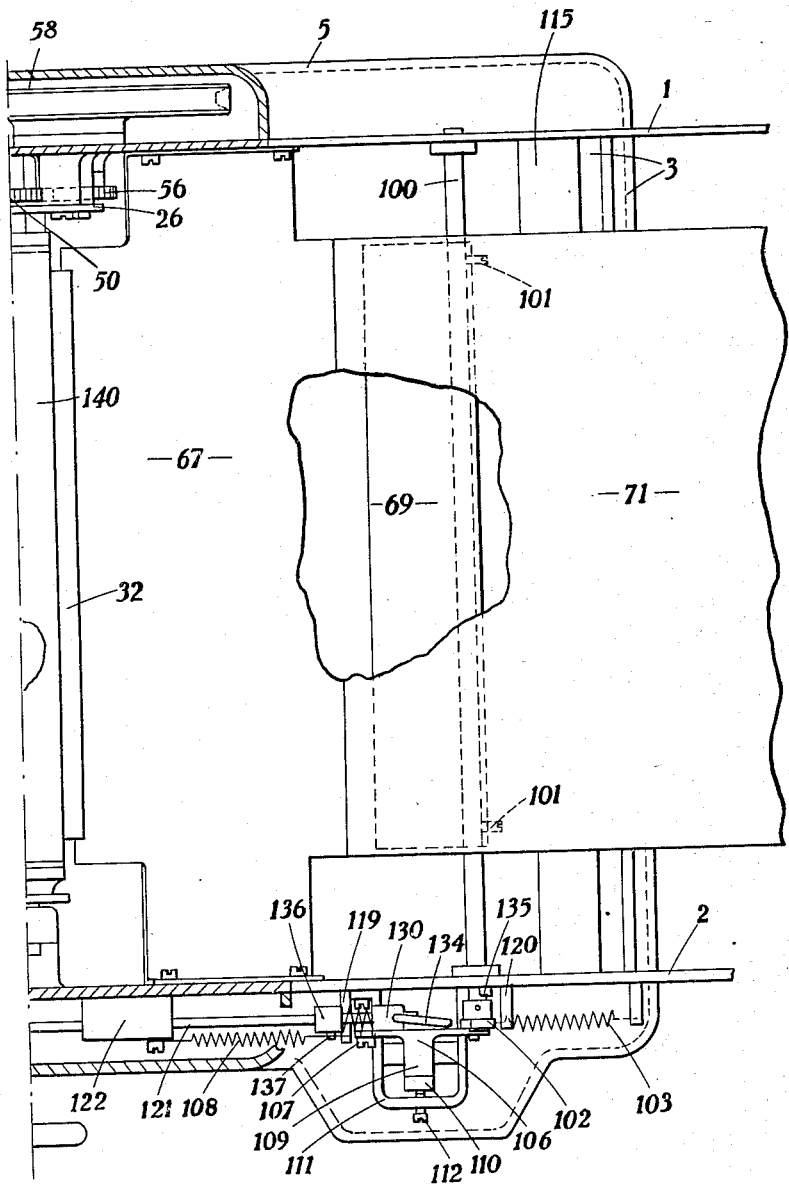

Figures 10 and 10A together illustrate a modification of Figure 1;

Figures 11 and 11A together represent a sectional plan view taken substantially on line XI—XI, Figure 10, with the drum rotated through an angle of about 180° from the position shown in Figure 1.

Figure 12 illustrates a master sheet suitable for use with the arrangement of Figures 10 and 11;

Figures 13 and 14 are examples of records which can be used with apparatus according to the invention;

Figures 15 and 16 are detail views in sectional elevation and plan, respectively, of a modification;

Figure 17 is a side view, similar to Figure 8, of a modification;

Figure 18 is a section on line XVIII—XVIII, Figure 17, and

Figure 19 is a section on line XIX—XIX, Figure 18.

Figure 3:
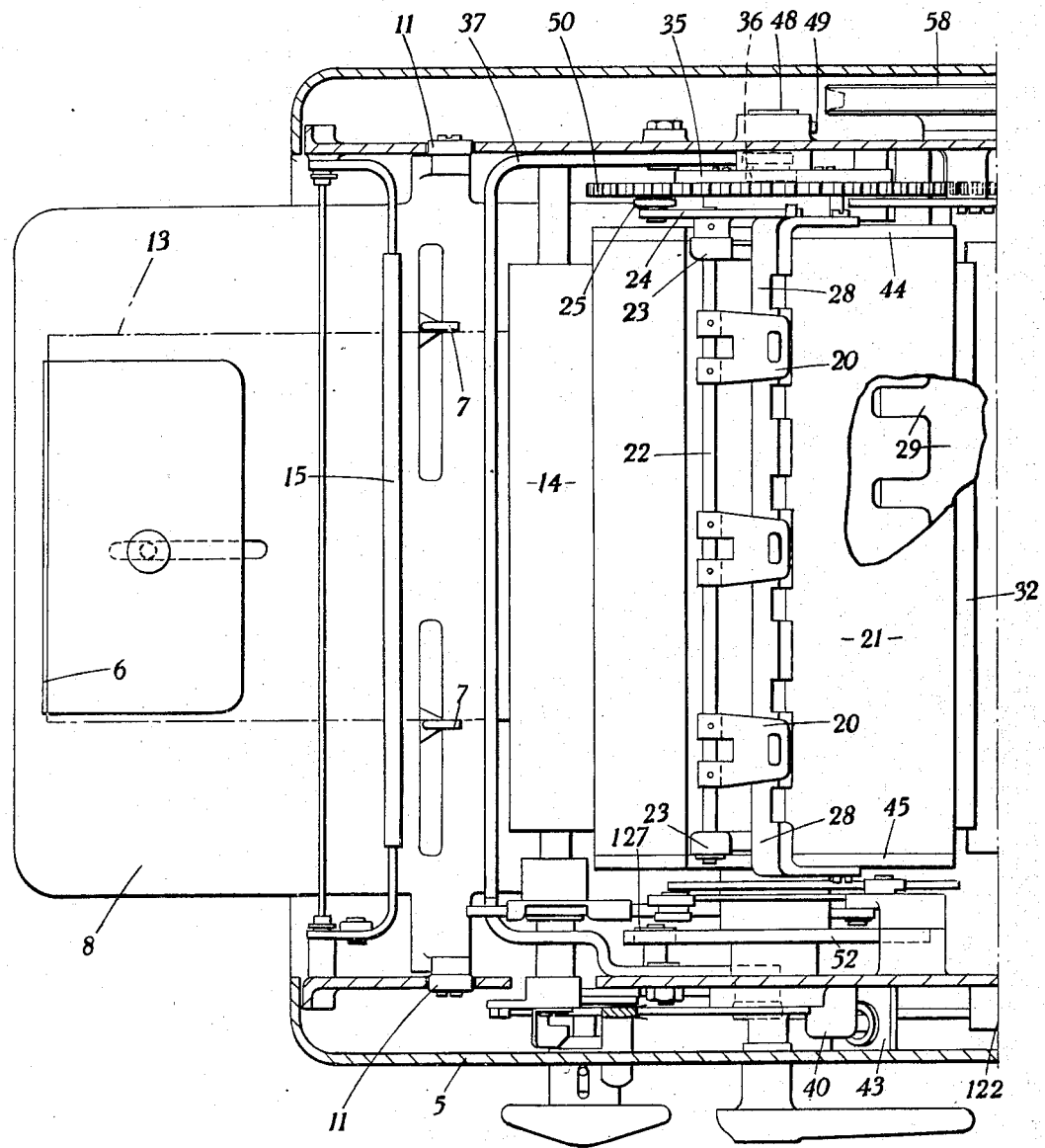

Referring first to Figures 1, 2 and 3, the side frames 1, 2 of the machine are braced together by means of a number of tie-rods 3, thus forming a supporting structure fixed to legs 4, a cover 5 being fixed to legs 4 and to side frames 1, 2. The sheet feeding and guiding means now to be described are substantially identical with those described in British patent specification No. 499,800 in connection with a printing machine comprising a rotary printing couple. This mechanism forms no part of the present invention, and may, moreover, be replaced by any other suitable known feeding and guiding mechanism. In the circumstances this mechanism is illustrated in the accompanying drawings only sufficiently to enable the general operation of the mechanism to be understood, and reference should be made, for a more complete description, to the above mentioned patent specification. In general, as shown in the drawings, the mechanism comprises a paper container, formed by a supporting table 6, side plates 7, and backplate 8, supported between the frame plates 1, 2. The paper-container can be moved up and down by means of racks 9, depending from each side of the table 6, and driven by pinions 10, rollers 11, mounted in the supporting table 6, being arranged for vertical movement in slots 12 in the side frames 1, 2. The up and down movement of the paper container is effected periodically depending on the thickness of sheets on the table 6.

As indicated in Figure 1, the paper feed is of the type in which the top sheet 13 is first separated by buckling it between the feed roller 14 and a stop bar 15 (or the back plate 8), thereby withdrawing it from underneath spring-loaded fingers 16, whereupon the feed roller 14 reverses its movement and causes the paper sheet 13 to pass over the top of the fingers 16 and between guides 17, 18 on to stops 19 carried on paper aligning fingers 20 pivotally mounted in a gap of the drum 21. The means for operating the feed roller 14, as also the means for operating the pinions 10, are not shown in the drawings but are fully described in specification No. 499,800.

The aligning fingers 20 are secured to a shaft 22 journalled in brackets 23 fixed to the drum 21. Fixed to the shaft 22 is an arm 24 carrying a roller 25 which co-operates with a stationary cam 26 secured to the side frame 1 of the machine.

The forward edge of the sheet 13 is aligned by the fingers 20, the rotation of the drum relatively to the cam 26 causing the fingers 20 to close under the influence of a spring 20a so as to bring the foremost end of the sheet into contact with the adjacent edge of the gap in the drum 21, whereby, as the drum turns, the sheet is engaged between the drum 21 and a counter-roller 27. The feed roller 14 is periodically moved up and down, being raised out of contact with the sheet immediately after its counter-clockwise rotation, at which time the sheet is gripped between the drum 21 and counter-roller 27. This is effected by means of a cam 35 acting on a roller 36 journalled in arms 37 supporting the shaft of the roller 14. Further rotation of the drum advances the paper sheet, and at the same time the cam 26 acting on the arm 25 causes the fingers 20 to open, whereupon a shoo-fly bar 28 is actuated to shift the forward edge of the sheet 13 out of the gap in the drum 21 and into the passage between a stripper-plate 29 and a guide 30, whereupon it is engaged by feed rollers 31, 32 mounted on shafts 33, 34 respectively.

According to the embodiment of the present invention illustrated in Figures 1-3 the drum 21 and the roller 27 are substituted for the rotary printing couple described in the above mentioned specification No. 499,800, and the remainder of the machine now to be described has been designed for the purpose of carrying out the present invention.

The counter-roller 27 comprises two parts, made of suitable material such as rubber, rigidly mounted in spaced relationship, and maintained in resilient contact with the drum 21 by means of springs 39 arranged to act on extensions of blocks 40 supporting the shaft 38 and slidably mounted in slots 41 in the side frames 1, 2 (Figure 8). The lower ends of the springs 39 rest in recesses in adjusting nuts 42 threaded into brackets 43 secured to the side frames.

For the purpose of easy assembly the drum 21 consists of two cylindrical segments 21A and 21B supported by hubs 44, 45 (Figure 2) rotatably mounted respectively on bearing bushes 46, 47, on a stationary shaft 48 mounted in the side frames 1, 2 and held against rotation by screws 49. The cam 35 and a driving gear 50 are secured to the hub 44 by means of screws 51, and a cam 52 is secured to the hub 45 by means of screws 53. The segments 21A, 21B, which are approximately semi-cylindrical, are secured to the hubs 44, 45 by means of screws 54, suitable holes 55 being provided in the side frames 1, 2 and also in the driving gear 50 to permit of easy access to the various screws. The driving gear 50 meshes with a pinion 56 (Figure 1) rotatably mounted on a trunnion 57 secured to the side frame 1. A pulley 58 is fixed to the pinion 56 and is driven by a belt 59 from a motor pulley 60, the motor 61 being supported by a bracket 62 pivotally mounted on a tie-rod 63 secured to the machine legs 4. A suitable tightness of the belt 59 can be obtained by adjusting a screw 64 threaded into a bracket 65 secured to the support 4.

The pinion 56 meshes with a pinion 66 rigidly mounted on the shaft 34 of the upper feed-roller 32. The feed-rollers 31, 32 eject the paper sheet 13 into a channel formed by guides 67, 68 secured to the side frames. On passing this channel the paper sheet is guided by a flap 69, the operation of which is hereafter described, into one of the receptacles 70, 71.

An electric lamp 72 is mounted in a socket 73 (Figure 2) fixed to a bracket 74 secured by a screw 75 to the side frame 2 below the drum 21. The lamp 72 is enclosed by a casing 76 provided with a slot 77, so that a beam of light is projected substantially vertically upwards on to a mask 78 secured to the frame work of the machine and provided with a comparatively narrow slot 79. Thus, after passing through the slot 79, the light beam illuminates a narrow area on the circumference of the drum 21.

The inner surface of the casing 76 is preferably made reflectant and, if desired, suitable lenses may be arranged in the casing in order to produce a highly concentrated beam of light.

A photocell 80 is mounted in a socket 81 fixed to a bracket 82 which is clamped by means of a yoke 83 and screws 84 to the stationary shaft 48 (Figure 1), so that the photocell 80 is positioned substantially in the plane of the light beam. A suitable casing 85 which opens downwardly is fixed to the bracket 82. A hole 86 is drilled into the shaft 48 for the leads 87 which connect the photocell 80 to an amplifier device 88 mounted on cross bars 114, fixed to brackets 115 secured to the supports 4 of the machine (Figure 1), and comprising the necessary power supply, valves, resistances, condensers and other electric appliances, the arrangement of which is well known and need not be described in detail.

A portion of the drum wall 21B is cut away and is replaced by an inset 89, see Figures 4 and 5. The inset 89 fits closely into a recess of the drum section 21B and is secured in position by counter-sunk screws 90. A number of scanning holes 91 is provided in the inset 89. In the embodiment shown in the drawings, thirty-six holes 91 are provided, arranged in twelve rows, each of three holes; however, any other number or arrangement may be used. Detachable plugs 92 may be removably inserted into the holes 91 so as to fit closely therein, these plugs being slightly tapered, so that, when the drum is in rotation, centrifugal force holds the plugs firmly in position.

Any one of the holes 91 may be cancelled or covered by inserting a plug 92, or the hole may be opened by withdrawing the plug. As the plugs can be withdrawn only inwardly, the inset 89 must be taken off before manipulating the plugs, and normally a number of spare insets 89 would be provided, so that a reserve inset can be prepared by plugging or deplugging the required holes, while the machine is running on another segregating job.

To ensure that the plugs do not drop out while the machine is working, they may be threaded into the inset 89, or they may be provided with spring-loaded latching or locking devices, well-known per se.

An alternative cancelling device for the scanning holes 91 is shown in Figures 6 and 7. Each hole is countersunk as at 93 and a small lid 94 is pivotally mounted on a screw 95, threaded into the inset 89. The lid 94 is made of a steel spring or similar suitable material, and it is provided with a pip 96 adapted to engage in the top of the hole and secure the lid 94 in position. To open the lid a screw-driver is inserted between the lid and the side of the recess 93, and a slight tilting movement of the tool will cause the lid 94 to swing into the position shown in Figure 7, whereupon the pip 96 enters a shallow depression or counter-sink 97 and holds the lid in the open position. This arrangement has the advantage that the holes 91 can be opened or closed as desired without taking off the inset 89.

An example of a record suitable for use in the machine according to the present invention is shown in Figure 13, which illustrates a filled-in football pool coupon. The coupon is printed on paper which is partially transparent, and it represents a list of twelve football matches to be played, marked respectively 1–12 in the column on the left, the names of the two teams taking part in each match being printed in the second column.

Each match is associated with a row of three squares or index points 98, thus forming three vertical columns of squares or index points marked respectively "Home 1," "Away 2" and "Draw X." Coupons of this kind are filled in by marking one of the three squares in line with each match to indicate what in the opinion of the person filling in the coupon will be the result of the match, i. e. whether the result will be a win for the team playing on the home ground, or a win for the team playing away from the home ground, or a draw. In the present case the selection of the three possible results is indicated by inking in or otherwise blacking out one of the three squares. Thus on the coupon shown in the case of match 1 the square under the heading "Draw X" has been inked in to indicate that the person filling in the form expects the result of the match between the teams Leeds United—Sheffield Wednesday to be a draw, and so on. The square thus inked in has a transparency which is different to that of the uninked squares or index points. When the coupon has been completed by inking in one of the three squares associated with each match, the coupon is returned to the issuing office, and, subsequently, when the matches have been played and the results known, those coupons which have been filled in correctly must be segregated from those which have been incorrectly filled in. For this purpose, all coupons are piled up in the paper stack 6 of the machine. The scanning holes 91 of the drum 21, each of which is associated with a correspondingly positioned square or index point 98 on the coupon 13, are now set or selected according to the correct solution, namely, one hole 91 in each row of three holes in the inset 89 is opened for the winning team or for a draw, as the case may be, the machine is then set in rotation, and one coupon after another is fed through the machine. As the drum 21 rolls upon the coupon, each row of squares 98 is brought in succession into the scanning plane in line with the slot 79 where it is aligned with a corresponding row of scanning holes 91. If a coupon corresponds exactly to the correct solution, each open hole 91 will be cancelled or obturated by the black mark on the corresponding square, and consequently, practically no light from the source 72 will penetrate to the cell. However, if the analysed coupon is marked incorrectly, one or more of the scanning holes 91 will not be cancelled, as the corresponding square or squares on the coupon has or have not been made opaque, and light will accordingly penetrate through the paper through one or more holes 91 to the photocell 80. This illumination of the photocell effects the rejection of the incorrectly marked records in a manner to be fully described hereafter.

Another type of record is illustrated by way of example in Figure 14, wherein the questionary form there shown has printed on it, on the left, certain data comprising a number of questions, the answers to which are to be filled in; and, on the right, a table or record 99 of squares or index points 98 comprising twelve rows, each row consisting of four index points. The answers to each question contained in the printed data such as "address," "age," "health" and the like can be grouped in a certain manner, all required groups being provided for on the form, and each group being numbered from 1–33 respectively. The index points 98 are numbered 1–48 respectively, each index point 1–33 being relevant to the correspondingly numbered group of answer, and the index points 34–48 being associated with a code, as hereafter described. When filling in the form the group corresponding to a correct answer to each question is underlined and the index point associated with the underlined answer is inked or blacked in. Thus, the form shown refers to a "Male" and the number associated with this group is "1"; accordingly "Male . . . . . . 1" is underlined and the index point marked "1" is inked in. The printed data may of course include matter which does not require to be marked on the table 99, such as "Remarks" and the like. The inking in of the index points should completely cover these points but may extend somewhat beyond the area of the index point as shown at index point 36.

The arrangement of index points shown in Figure 14 is suitable for use with a 5-point code, as illustrated in the table in the lower left hand corner of the figure. In the example given the digital values 0–9 are represented, for units, by combinations of index points numbered 44–48, for tens, by combinations of index points numbered 39–43, and, for hundreds, by combinations of index points 34–38. This five-point code is utilised in the example given for recording the registration number, namely 735, the corresponding index points 36, 37; 39, 43, and 45, 47 being inked in.

If the machine is to be used for segregating records of the kind shown in Figure 14, the inset 89 should of course be adapted for this purpose, i. e. twelve rows, each of four holes 91, should be provided, having the same spatial relationship as the index points 98. It will be understood that the records must be printed with a certain degree of accuracy and that prior to the segregating operation the paper feed must be adjusted in the customary manner by means of blank records both longitudinally and transversely, so that the squares 98 are correctly aligned with the corresponding scanning holes 91 when the coupons are fed through the machine. The means provided for effecting this adjustment may be of the kind well known in office printing machinery, and need no particular description. Alternatively, as shown in Figures 15 and 16, the inset 89 may be made adjustable by elongating the holes for the screws 90 as shown at 152. The unavoidable inaccuracies of the paper feed are compensated by making the index points 98 larger than the holes 91, so as to ensure that within a certain tolerance each scanning hole coincides with, and is completely covered by, the corresponding index point.

The actual segregating operation controlled by the photocell 80 will now be described. The sorting flap 69 is secured to a shaft 100 by means of set screws 101 (Fig. 1A). The shaft 100 is rockably journalled in the side frames 1, 2, and a lever 102 is rigidly mounted on the shaft 100 outside the side frame 2 (Figure 8). A spring 103 tends to swing the lever 102 anti-clockwise, and consequently the flap 69 downwardly. A stud 104 on the lever 102 co-operates with a latching nose 105 on an armature 106 pivotally mounted as at 107 and biased anti-clockwise by a spring 108. The armature 106 is bent to form a lip 109 (Figure 2) co-acting with an electromagnet 110 secured by means of a bracket 111 and screws 112, 113, to the side frame 2. The electromagnet 110 is shown diagrammatically in co-ordination with the relevant parts of the machine in Figure 9, which also shows the electrical connections. In the normal position, e. g. when the photocell 80 is unilluminated, the electromagnet 110 is energised by current supplied from the amplifier 88 and it holds its armature 106 against the tension of the spring 108. In this position the lever 102 is latched by the armature 106 against the tension of the spring 103, and the flap 69 is in the upper position shown in full lines in Figures 1 and 9. The flap 69 remains in this position as long as the photocell 80 remains unilluminated, e. g. as long as correct records 13 pass through the machine and the open scanning holes 91 are cancelled by the corresponding black squares 98 on the records. When the photocell 80 is illuminated, the electrical impulse produced is amplified in the amplifier device 88 and energises a relay 116, which opens the contact 117 and breaks the circuit 118 of the electromagnet 110. Consequently, the armature 106 is pulled away from the magnet 110 by the spring 108, whereby the lever 102 is unlatched and swings anti-clockwise under the influence of the spring 103, thereby moving the flap 69 downwards. In this downward position of the flap 69, the paper sheet 13 travels over the top of the flap 69, whereas in the upper position of the flap 69 the paper sheet travels underneath the flap. As shown in Figure 1, the correct records, e. g. such records which pass underneath the flap 69, drop into the bin 70 reserved for correct records, whereas the sheets passing over the top of the flap 69 travel into the bin 71 for incorrect records.

The mechanism for re-setting the armature 106 and the flap 69 is shown in Figure 8. When the armature 106 is released by the magnet 110, it is swung by the spring 108 on to a stop 119, and the lever 102 is swung by spring 103 on to a stop 120 secured to the side frame 2. A push-rod 121 is arranged to slide in a bearing 122 secured to the side frame 2. One end of the push-rod 121 is connected by means of a shank screw 123 to the lower end of a swing lever 124 pivoted at 125 and biased clockwise by a spring 126. The upper end of the lever 124 carries a roller 127 protruding through a slot 128 in the side frame 2 so as to co-operate with the cam 52 fixed to the hub 45 of the drum 21. The arrangement is such that after the passage of each sheet between the drum 21 and the counter roller 27, the cam 52 causes the lever 124 to swing counter-clockwise. The lower end of the lever 124 is slotted as at 129, so that the shank screw 123, sliding in the slot 129, forces the push-rod 121 to shift to the right. The push-rod 121 carries on its outer end a bush 130 adapted to slide along the rod 121, the bush being held against rotation by a pin 131 carried on the rod 121 and projecting into a slot in the bush 130. A spring 132 normally presses the bush 130 against the stop 133 fixed to the push rod 121. The bush 130 carries a finger 134 arranged in line with the upper end of the lever 102. When the rod 121 is pushed to the right by lever 124, the finger 134 restores the lever 102 and swings it clockwise on to a stop 135, e. g. somewhat beyond the normal position shown in Figure 8, the rod 121 continuing its movement and compressing the spring 132. A further bush 136 is rigidly fixed to the rod 121 and has a finger 137 aligned with the upper end of the armature 106, and as the push-rod 121 continues to travel to the right, the finger 137 restores the armature 106 by swinging it clockwise on to the magnet 110. In the meantime the lever 102 has been moved by the finger 134 slightly beyond its normal position, as above described, so that the stud 104 does not interfere with this resetting movement of the armature 106. The cam 52 now restores the roller 127 so that the lever 124 swings clockwise again, and the push-rod 121 is withdrawn to the left; meanwhile the magnet 110 is again energised and the armature 106 remains attracted and latches the lever 102 in the position shown in Figure 8, the flap 69 being now again in the upper position, in which it will remain so long as correct records 13 pass through the machine, during which time the push-rod 121 moves idly to and fro.

If the number of holes 91 is considerable, the manipulation of the plugs 92 or lids 94 for the required set-up may take an appreciable amount of time. The set-up may be speeded up by adopting the modification shown in Figures 10–12. According to this modification, a number of lugs 138 are fixed adjacent the gap of the drum 21, these lugs being adapted to enter openings 139 of a master sheet 140 (illustrated in Figure 12) of opaque material such as strong paper, or metal sheet. A retaining bar 141, carrying a number of prongs 142, is mounted on the other side of the gap in two arms 143 pivoted on the sides of the drum 21 as at 144. Springs 145 tend to swing the retaining bar 141 inwardly. The master sheet 140 is positioned on the lugs 138 and then wrapped around the drum 21, whereupon the operator grasps the retaining bar 141, rocking it about its pivot 144, and inserts the prongs 142 into openings 139A formed on the other end of the master sheet 140.

In the present case it is assumed that the master sheet is to be used for segregating records marked similarly to the record of Figure 11. If the inset were used, those holes 91 corresponding to the inked or blackened index points 98 would be left open, and all the remaining holes 91 would be covered or obturated. When the master sheet is used, it is utilised to cover all the holes 91 which would be otherwise obturated by the plugs or lids above described, and slots 146 are made in the opaque sheet in places above those holes 91 which would be left open. Thus, the slots 146 are provided for the required selection only, namely, only for such squares 98 which have been blacked out on the correct record 13, and the master sheet 140 represents an equivalent and alternative cancelling device for the plugs 92 or lids 94. The operation of the machine is exactly the same as already described, and the arrangement of the component parts is the same as in Figures 1–9.

The master sheets 140 can be readily stored away and kept for future use. The use of master sheets is particularly advantageous when repeated segregating operations are required with the same set-up comprising a great number of scanning holes.

It will be noted that the photocell 80 responds only to such squares 98 which have been left blank. Consequently, if by any chance all squares 98 on a record have been blacked out, this record will be segregated as a "correct" record, no matter what the set-up of the machine may be. In the case of football pools, for example, all the index points on a coupon may be blacked out with fraudulent intent. In order to eliminate this difficulty, the selected records should be checked up visually, or by means of another selective operation, so as to get rid of completely black records. For this additional selection, all scanning holes 91 should be opened, and the machine will consequently segregate as "correct" only completely black records, the remaining records being those filled in in the prescribed manner. Alternatively, the second selection may be effected with regard to one of the two squares in each row which should remain blank. If this operation is repeated for the second square to remain blank, the remaining or correct records will be only those which are marked in the correct squares and are not marked in the wrong squares.

The master sheet 140 may be an opaque stencil, for example such as used in office printing machines, and may additionally be used for printing purposes, the matter to be printed being carried on that part of the stencil not occupied by the slots 146, and means being provided for applying ink to the stencil. Such means are incorporated in the modification shown in Figures 10 and 11, in which an ink-roller 147 is rotatably journalled in slots in the side frames 1, 2, parallel to the axis of the drum 21, and an ink trough 149 to prevent superfluous ink from dropping into the machine, is fixed by one or more screws 150 to a tie-rod 3. The ink roller 147 is held in contact with the stencil by means of springs 148 anchored in the side frames 1, 2. As customary in office duplicators, the ink may be applied to the roller 147 by hand, for example with a brush, but an automatic inking device may be used. In order to prevent ink choking the slots 146 cut in the stencil, and the scanning holes 91 in the drum, a portion of the ink roller 147 equal in width to the inset 89, is reduced in diameter as shown at 151.

The printing can be effected simultaneously with the sorting operation, or separately therefrom. If it is desired only to perform a printing operation, the sorting device is set out of action by switching off the amplifier 88. Thus the machine can be used for printing purposes alone in a manner similar to existing office printing machines.

Sometimes it is desirable to segregate not only completely correct records, but also such records which contain a certain number of correctly filled-in items. With reference to the coupon shown in Figure 13, for instance, it may be desirable to segregate such coupons which are not completely correct, but contain a certain number of correct predictions, for example, any eleven correct results for the twelve matches.

This selection can be effected by the modified arrangement shown in Figure 17–19 in which a disc 153, fixed to the cam 52 previously described, is furnished with twelve tooth-like elevations 154, each elevation being associated with, and positioned at a fixed distance from, one row of scanning holes in the inset 89. A swing lever 155 is pivotally mounted as at 156 and is biased anti-clockwise by a spring 156'. An extension 157 of the swing lever 155 is arranged to protrude through a slot 158 in the side frame 2, this extension being shaped so as to co-operate with the elevations 154 on the disc 153. A link 159 connects the swing lever 155 to a bracket 160 pivotally mounted on a trunnion 161 secured to the side frame 2 by a nut 162. A pawl 163 is rockably mounted on the bracket 160 as at 164. A torsion spring 165 forces the pawl 163 into engagement with teeth on a ratchet wheel 166 rotatably mounted on the trunnion 161. A clock-spring 167, fixed at one end by means of a screw 168 to the trunnion 161, and at the other end to a stud 169 secured to the ratchet wheel 166, tends to turn the ratchet wheel 166 anti-clockwise. A detent 170 mounted on the extended shaft 100 of the flap 69 is forced by a pressure spring 171 into engagement with the ratchet wheel 166 so as normally to hold it against rotation, the spring 171 being mounted in a recess in a bracket 172 secured to the side frame 2. A disc 173, mounted on a hub of the ratchet wheel 166, to which it is fixed by means of screws 174, has a recess 175 co-operating with a lever 176, rigidly mounted on a shaft 100, and pressed into contact with the disc 173 by a pressure spring 177, mounted in a recess of the bracket 172. A washer 178 fixed by a screw 179 to the trunnion 161 prevents the disc 173 from slipping off the trunnion. A cam-like member 180 is rockably mounted on the trunnion 161 and is connected, as at 181, to the plunger 182 of the solenoid magnet 183, which is energised and de-energised in exactly the same manner as the magnet 110 (Figure 9). A tension spring 184 anchored in the side frame 2 tends to swing the cam member 180 clockwise, the arrangement being such that when the solenoid 183 is energised, it overcomes the tension of the spring 184 and holds the cam member 180 in the position shown in Figures 17–19. If, however, the solenoid 183 is de-energised by an impulse received from the photocell 80 when the latter is illuminated, the spring 184 swings the cam member 180 so that a stud 185 fixed to the pawl 163 rests on the elevated portion of the cam member 180.

The lever 176 normally rests on the periphery of the disc 173, thus holding the flap 69 in the lower position, shown in Figure 17. When the machine is set in motion, an elevation 154 causes the swing lever 155 to swing clockwise immediately after a row of squares 98 has been analysed. If this row of squares 98 has been correctly filled in, the photocell will remain unilluminated, the solenoid 183 will remain energised, and the cam member 180 will remain in the position shown in Figure 19, so that the stud 185 on the pawl 163 just clears the elevated part of the cam member 180 and the pawl 163 is free to engage the ratchet wheel 166. If, now, the bracket 160 is rocked clockwise by the link 159, the pawl 163 will turn the ratchet wheel 166 one step in the clockwise direction. If, however, the scanned row of squares 98 contained a wrong result, the photocell 80 will be illuminated, the solenoid 183 will be de-energised, and the cam member 180 will swing clockwise under the action of spring 184, so that its elevated portion will push the stud 185 outwardly, thus disengaging the pawl 163 from the ratchet wheel 166. If now the bracket 160 is rocked clockwise by lever 155 and rod 159, the nose of the pawl 163 will skip the tooth on the ratchet wheel 166 and the ratchet wheel will remain stationary. Thus, it will be seen that the ratchet wheel 166 and the disc 173 will be stepped clockwise whenever the analysed row of squares 98 contains a correct result, and they will remain stationary whenever the scanned squares 98 are not correctly marked. The recess 175 in the disc 173 is arranged at such a distance from the nose of the lever 176 that it is aligned with the nose after the requisite number of steps of the ratchet wheel 166, e. g. after the requisite number of correct results has been ascertained, in the present example eleven. When the recess 175 is aligned with the lever 176, the spring 177 causes the lever 176 to swing into the recess, thereby swinging the sorting flap 69 upwards, so that the analysed sheet 13 after being ejected from the machine is caused to pass underneath the flap 69 into the bin 70 for correct records. If in the whole scanning operation the total number of correct results on the coupon was less than eleven, the recess 175 would not reach the lever 176 at all, and the flap 69 will remain in the lower position, so that the coupon, when ejected, will pass over the top of the flap 69 into the bin 71 for wrong records.

The lever 176 has an extension 186 adapted to open a switch 187 in the circuit of the solenoid 183 whenever the lever 176 swings clockwise into the recess 175 in the disc 173. Thus, once the flap 69 has been swung open, the solenoid 183 will remain de-energized without regard to the action of the photocell, holding the cam member 180 in the position which renders the pawl 163 inoperative, as already described, so that the ratchet wheel 166 will remain stationary for the rest of the scanning cycle. After a sheet has been ejected, a push-rod 188 is shifted by the swing lever 124, previously described, to the right, thereby moving the lever 176 out of the recess 175, and the detent 170 out of engagement with the ratchet wheel 166. The clock spring 167 is now free to restore the ratchet wheel 166 and the disc 173 to the starting position on to a stationary stop 189, secured on a standard 190 fixed to the side frame 2, whereby the switch 187 is again closed, and the parts are in position to start another scanning cycle as the next record is fed into the scanning position.

It will be evident that the position of the recess 175 relatively to the starting position of the disc 173 is determined by the desired number of correct results on the coupon 13. A set of discs 173 may be provided with differently positioned recesses 175, corresponding for example to eleven, ten or other number of correct results. The required selection is prepared by taking off the screw 179 and the retaining washer 178 and by fixing the appropriate disc 173 to the ratchet wheel 166 by means of the screws 174.

The sorting device forming the subject of the present invention may be incorporated if desired in all known kinds of rotary drum office printing machines employing one or more drums, irrespective of whether the printing is effected from a stencil, or offset form, or letter type. In the case of machines where the member equivalent to the counter roller 27 described herein is a drum, the lamp 72 can suitably be positioned inside this drum, provision being made in the drum for the passage of light.

In the case of machines fitted with a printing device, the records such as the coupon 13, or form 99, may be printed in the same machine in which, after being filled in, they are to be sorted. If the machine is to be used for purposes other than printing such coupons or forms, the whole surface of the drum 21 may be made available for printing by replacing the apertured inset 89 by a plain inset, the ink-roller 147 having the recess 151 being also replaced by a plain roller.

It is customary in office printing machines to provide counters attached to the paper feed and adapted to count the number of sheets passed through the machine. Such a counter may readily be used in a machine according to the present invention. In addition, a counter may be attached on the delivery side of the machine to be operated by the lever 102 on the shaft 100 of the sorting flap 69. This counter would operate every time the flap 69 closes, e. g. it would count all records which do not correspond to the set-up of the scanning holes 91. If it is desired only to count records of a certain description without actually sorting them, the sorting flap 79 may be put out of action by loosening the set screws 101 so that it is no longer operated by the lever 102.

It will be evident that the described arrangement can be modified in various ways without departing from the spirit of the invention. For instance, the position of the photocell 80 and the lamp 72 may be reversed; the electro-magnet 110 may be arranged to attract the armature 106 instead of releasing it, when actuated by the photocell; the photocell 80 may be arranged to respond not to light but to absence of light; and the black marks on semi-transparent records 13 may be replaced by transparent marks or slots on otherwise non-transparent records.

The photocell 80 and the lamp 72 may be replaced by equivalent devices sensitive to, and generating respectively, other kinds of radiant energy, for instance infra-red rays, if the records are made of a material adapted to influence the free passage of radiant energy used.

What I claim is:

1. Apparatus for assorting record cards and like sheets in which the recorded information is represented by a pattern comprising differently positioned marks having a transparency different from that of the record sheet, comprising, in combination, a source of radiant energy, a device sensitive to said radiant energy, a rotary scanning member disposed between the source of radiant energy and the sensitive device, said rotary scanning member comprising means for setting up a definite pattern by selectively blocking light transmitting areas corresponding to light transmitting areas of a card pattern to be accepted, means for feeding the record sheets into an analysing position between the source of radiant energy and the sensitive device, in which position the marks on a record sheet are analysed by said rotary scanning member, and means for forwarding the record sheet from the analysing position and for delivering it into one of two receptacles, said means comprising a sorting flap controlled by the sensitive device.

2. In apparatus for assorting record cards and like sheets in which the recorded information is represented by a pattern comprising differently positioned marks having a transparency different from that of the record sheet, said marks being analysed by a rotary scanning member co-operating with a source of radiant energy and a device sensitive to this radiant energy, said device controlling a sorting flap, a rotary scanning member comprising means for setting up a definite pattern by selectively blocking light transmitting areas corresponding to light transmitting areas of a card pattern to be accepted and having a plurality of rows of scanning apertures arranged respectively to scan successively corresponding rows of marks on the record sheet when the latter is fed through the analysing position, all the marks in one row on the record sheet being scanned simultaneously, and means for feeding the record sheets successively into the analysing position so that all rows of marks on one record sheet are scanned during one revolution of the scanning member.

3. Apparatus according to claim 1 wherein the rotary scanning member comprises a drum having its wall perforated with a plurality of scanning apertures and further comprising means for selectively obturating said apertures in order to modify the set-up of the drum.

4. Apparatus according to claim 1 wherein the rotary scanning member comprises a drum having its wall perforated with a plurality of scanning apertures and further comprising separately operable obturating members for selectively cancelling said apertures.

5. Apparatus according to claim 1 wherein the rotary scanning member comprises a drum having its wall perforated with a plurality of scanning apertures and further comprising means for selectively obturating said apertures in order to modify the set-up of the drum, said means comprising an opaque sheet adapted to be detachably secured to the drum and having a plurality of scanning apertures, the arrangement being such that when in position on the drum each scanning aperture in the opaque sheet is aligned with a scanning aperture in the drum.

6. Apparatus according to claim 1 wherein the rotary scanning member comprises a drum having a portion of its wall perforated with a plurality of scanning apertures, and further comprising means for selectively obturating said apertures in order to modify the set-up of the drum, said means comprising an opaque sheet adapted to be detachably secured to the drum and having a plurality of scanning apertures, the arrangement being such that when in position on the drum each scanning aperture in the opaque sheet is aligned with a scanning aperture in the drum, the imperforate portion of the opaque sheet carrying matter to be printed 7. Apparatus according to claim 1 further comprising an electro-magnet for controlling, under the influence of the sensitive device, the movement of the sorting flap, and cam means operating in synchronism with the scanning member to restore the armature of the electro-magnet and the sorting flap, when they have been actuated, on the completion of each scanning cycle.

8. Apparatus according to claim 1 further comprising rotary selector means for controlling the movement of the sorting flap, and a magnetic device for controlling, under the influence of the sensitive device, the rotary selector means.

9. Apparatus according to claim 1 further comprising rotary selector means for controlling the movement of the sorting flap, said rotary selector means comprising a selector disc, a pawl and ratchet arranged to rotate stepwise the selector disc, means for actuating the pawl after each scanning operation, a magnetic device under the influence of the sensitive device, and cam means, actuated by the magnetic device, to control the engagement and disengagement of the pawl and ratchet device in order to control the rotation of the selector disc in conformity with the results produced by the successive scanning operations.

DANIEL BROIDO.